United States Patent
Okubo et al.

(10) Patent No.: US 11,557,769 B2
(45) Date of Patent: Jan. 17, 2023

(54) SEPARATOR AND METHOD OF PRODUCING SEPARATOR

(71) Applicant: HONDA MOTOR CO., LTD., Tokyo (JP)

(72) Inventors: Takuro Okubo, Wako (JP); Masayuki Katsuno, Wako (JP); Yuki Otani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 104 days.

(21) Appl. No.: 17/212,469

(22) Filed: Mar. 25, 2021

(65) Prior Publication Data
US 2021/0305590 A1    Sep. 30, 2021

(30) Foreign Application Priority Data
Mar. 27, 2020    (JP) .............................. JP2020-057531

(51) Int. Cl.
| | |
|---|---|
| *H01M 8/0254* | (2016.01) |
| *H01M 8/1004* | (2016.01) |
| *H01M 8/0258* | (2016.01) |
| *H01M 8/0273* | (2016.01) |
| *H01M 8/0267* | (2016.01) |

(52) U.S. Cl.
CPC ....... *H01M 8/0254* (2013.01); *H01M 8/0258* (2013.01); *H01M 8/0267* (2013.01); *H01M 8/0273* (2013.01); *H01M 8/1004* (2013.01)

(58) Field of Classification Search
CPC ............. H01M 8/0254; H01M 8/0258; H01M 8/0267; H01M 8/0273; H01M 8/1004; H01M 8/0276; H01M 8/0278; H01M 8/0202; H01M 8/00; Y02P 70/50; Y02E 60/50
See application file for complete search history.

(56) References Cited

U.S. PATENT DOCUMENTS

| | | | |
|---|---|---|---|
| 2018/0114994 A1 | 4/2018 | Blakeley et al. | |
| 2018/0219233 A1* | 8/2018 | Ishida ................. | H01M 8/0258 |
| 2018/0226663 A1* | 8/2018 | Ishida ................. | H01M 8/0258 |
| 2018/0226665 A1* | 8/2018 | Oyama ............... | H01M 8/1004 |
| 2019/0097244 A1* | 3/2019 | Oyama ............... | H01M 8/0258 |
| 2020/0388858 A1* | 12/2020 | Ohmori ............... | H01M 8/0267 |

\* cited by examiner

*Primary Examiner* — Muhammad S Siddiquee
(74) *Attorney, Agent, or Firm* — Carrier Shende & Associates, P.C.; Joseph P. Carrier; Fulchand P. Shende (57) ABSTRACT

A separator is stacked on each of both surfaces of a membrane electrode assembly to form a fuel cell. This separator includes a base part extending in the form of a surface, and a bead continuous with the base part and protruding from the base part in a stacking direction. The bead includes, in plan view, a straight section extending straight and a curved section continuous with the straight section and curved from the straight section. In the separator, the height from the base part to a top part of the curved section is configured to be lower than the height from the base part to a top part of the straight section.

11 Claims, 8 Drawing Sheets

SEPARATOR AND METHOD OF PRODUCING SEPARATOR

CROSS-REFERENCE TO RELATED APPLICATION

This application is based upon and claims the benefit of priority from Japanese Patent Application No. 2020-057531 filed on Mar. 27, 2020, the contents of which are incorporated herein by reference.

BACKGROUND OF THE INVENTION

Field of the Invention

The present invention relates to a separator applied to a fuel cell, and a method of producing the separator.

Description of the Related Art

A fuel cell includes a membrane electrode assembly (MEA) and a pair of separators (bipolar plates) sandwiching the MEA. The MEA is formed by stacking an anode, an electrolyte membrane, and a cathode together. In the state where the pair of separators are stacked together, seals are formed between the separators and the MEA, or between the separators and other separators, for preventing leakage of reactant gases (a fuel gas and an oxygen-containing gas) and for allowing only predetermined reactant gases to flow between reactant gas flow fields and reactant gas passages.

For example, the specification of U.S. Patent Application Publication No. 2018/0114994 discloses a separator provided with a bead seal (bead) protruding from a separator surface, for forming a seal around reactant gas passages. In the state where the separators are stacked together, this bead is pressed by members (the MEA and/or another separator) which face the bead in the stacking direction. As a result, a top part of the bead is deformed elastically to form the seal.

SUMMARY OF THE INVENTION

In this regard, as disclosed in the specification of U.S. Patent Application Publication No. 2018/0114994, in the bead having a curved section in a direction in which the bead extends, elastic deformation of the curved section having large curvature does not occur easily in comparison with a straight section extending straight (part where the curvature is almost zero). Therefore, in the bead, the surface pressure becomes high in the curved section, and variation occurs in the surface pressure in comparison with the straight section. In the case where variation occurs in the surface pressure of the bead in the seal state as described above, the seal performance of the bead is lowered undesirably.

The present invention is related to the technique of the separator having the bead as described above, and an object of the present invention is to provide a separator and a method of producing the separator in which, with a simple structure, it is possible to reduce variation in the surface pressure in the bead having a straight section and a curved section.

In order to achieve the above object, according to a first aspect of the present invention, a separator is provided. The separator is configured to be stacked on each of both surfaces of a membrane electrode assembly to thereby form a fuel cell. The membrane electrode assembly includes an electrolyte membrane and electrodes provided on both surfaces of the electrolyte membrane. The separator includes a base part extending in the form of a surface, and a bead continuous with the base part and protruding from the base part in a stacking direction to form a seal. The bead includes, in plan view, a straight section extending straight and a curved section continuous with the straight section and curved from the straight section. The height from the base part to a top part of the curved section is lower than the height from the base part to a top part of the straight section.

Further, in order to achieve the above object, according to a second aspect of the present invention, a separator is provided. The separator is configured to be stacked on each of both surfaces of a membrane electrode assembly to thereby form a fuel cell. The membrane electrode assembly includes an electrolyte membrane, and electrodes provided on both surfaces of the electrolyte membrane. The separator includes a base part extending in the form of a surface, and a bead continuous with the base part, and protruding from the base part in a stacking direction to form a seal. The bead includes at least two curved sections in plan view. Of the curved sections, the height of one curved section having a larger curvature is lower than the height of another curved section having a smaller curvature.

Further, in order to achieve the above object, according to a third aspect of the present invention, a method of producing a separator is provided. The separator is configured to be stacked on each of both surfaces of a membrane electrode assembly to thereby form a fuel cell. The membrane electrode assembly includes an electrolyte membrane and electrodes provided on both surfaces of the electrolyte membrane. The separator includes a base part extending in the form of a surface, and a bead continuous with the base part and protruding from the base part in a stacking direction to form a seal. The bead includes, in plan view, a straight section extending straight and a curved section continuous with the straight section and curved from the straight section. When the separator is produced, the bead is formed in a manner that the height from the base part to the top part of the curved section is lower than the height from the base part to a top part of the straight section.

In the separator and the method of producing the separator, with a simple structure, it is possible to reduce variation in the surface pressure in the bead having the straight section and the curved section.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, preferred embodiments of the present invention will be described in detail with reference to the accompanying drawings.

Figure 1:
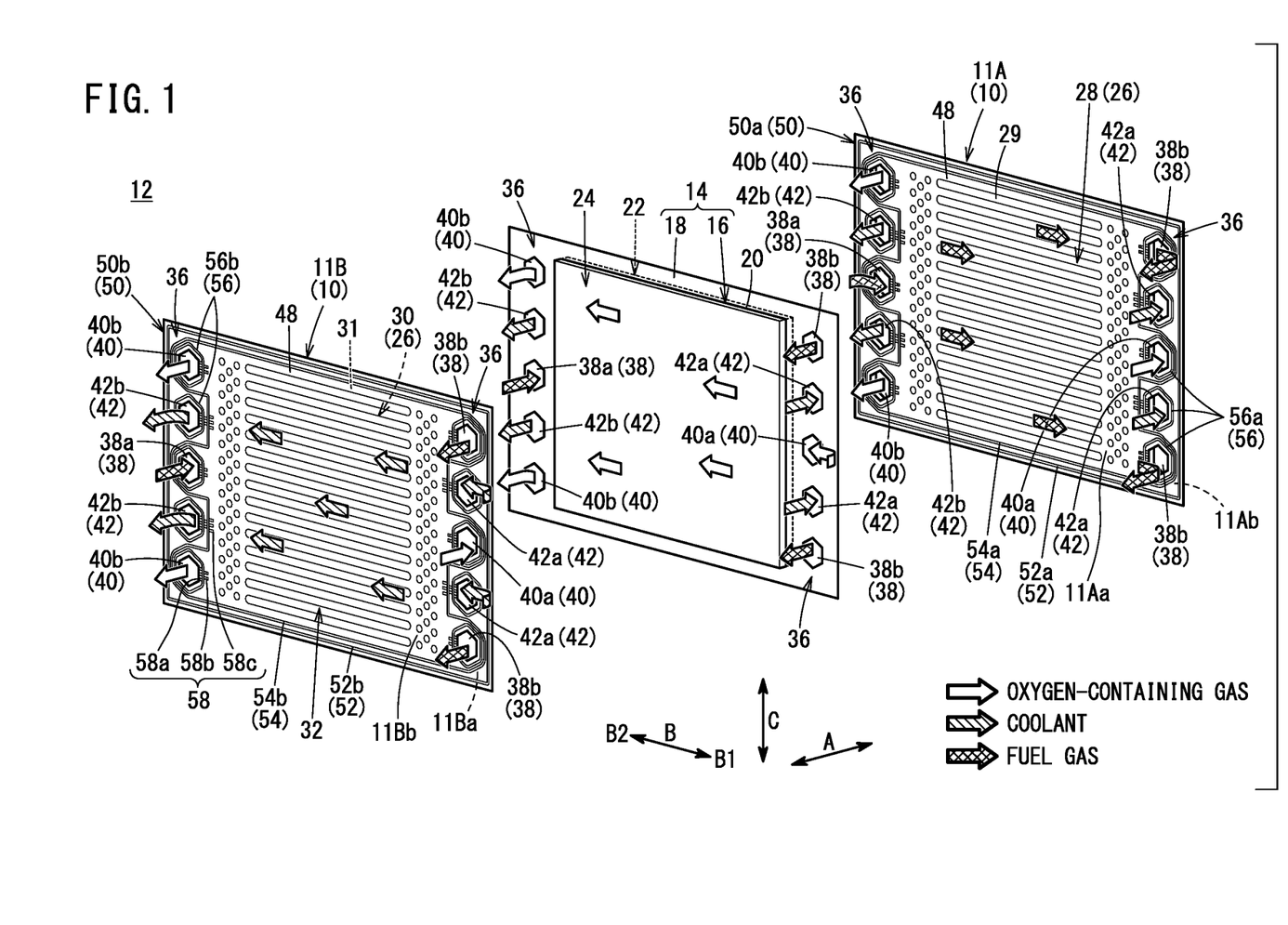
FIG. 1 is an exploded perspective view showing a fuel cell according to an embodiment of the present invention.

As shown in FIG. 1, a separator 10 according to an embodiment of the present invention is applicable to a fuel cell 12 which performs power generation based on reactions of a fuel gas (anode gas) and an oxygen-containing gas (cathode gas). The fuel cell 12 forms a component unit of power generation cell (unit cell). A plurality of the fuel cells 12 are stacked together in a direction indicated by an arrow A to thereby form a fuel cell stack (not shown). For example, the fuel cell stack is mounted in a fuel cell automobile (not shown), and used as a power source for in-vehicle devices such as a motor.

The fuel cell 12 is formed by stacking a pair of separators 10 on both surfaces of a frame equipped membrane electrode assembly 14 (hereinafter referred to as the frame equipped MEA 14). The frame equipped MEA 14 includes a membrane electrode assembly 16 (hereinafter referred to as the MEA 16), and a resin frame member 18 fixed to the entire outer periphery of the MEA 16. It should be noted that, the fuel cell 12 may adopt the MEA 16 which does not have any resin frame member 18 instead of the frame equipped MEA 14.

As shown in FIG. 1, the MEA 16 includes an electrolyte membrane 20 (cation ion exchange membrane), an anode 22 stacked on one surface of the electrolyte membrane 20, and a cathode 24 stacked on the other surface of the electrolyte membrane 20.

For example, the electrolyte membrane 20 is a thin membrane of perfluorosulfonic acid containing water. A fluorine based electrolyte may be used as the electrolyte membrane 20. Alternatively, an HC (hydrocarbon) based electrolyte may be used as the electrolyte membrane 20.

The anode 22 and the cathode 24 include electrode catalyst layers (not shown) disposed on both surfaces of the electrolyte membrane 20, and gas diffusion layers disposed outside the electrode catalyst layers (opposite to the electrolyte membrane 20). For example, the gas diffusion layer is made of carbon paper, etc. The electrode catalyst layer is formed by depositing porous carbon particles uniformly on the surface of the gas diffusion layer, and platinum alloy is supported on surfaces of the carbon particles.

The resin frame member 18 of the frame equipped MEA 14 is joined to an outer peripheral surface of the electrolyte membrane 20. Examples of the materials of the resin frame member 18 include general purpose plastics, engineering plastics, super engineering plastics, etc. having electrically insulating properties. The resin frame member 18 may be made of a film, etc.

The resin frame member 18 (frame equipped MEA 14) joined to the MEA 16 has substantially the same surface size as the rectangular separator 10. A plurality of fluid passages 36 are provided at both ends of the resin frame member 18 in the long side direction (direction indicated by the arrow B) in the same manner as the plurality of fluid passages 36 of the separator 10.

Each of the pair of separators 10 (11A, 11B) is formed by press forming of a metal plate to have a corrugated shape in cross section and a wavy shape on the surface. For example, the metal plate is a steel plate, a stainless steel plate, an aluminum plate, a titanium plate, a plated steel plate, or a metal plate having an anti-corrosive surface by surface treatment. The thickness of each of the separators 10 is, though not limited to specially, e.g., set in the range of 50 μm to 500 μm.

Each of the separators 10 has a reactant gas flow field 26 for allowing a reactant gas (a fuel gas or an oxygen-containing gas) in a surface direction of the frame equipped MEA 14. Hereinafter, the separator 10 stacked on one surface of the frame equipped MEA 14 will also be referred to as the first separator 11A, and the separator 10 stacked on the other surface of the resin frame equipped MEA 14 will also be referred to as the second separator 11B. When the fuel cells 12 are stacked together, the first separator 11A of one of the fuel cells 12 and the second separator 11B of the other of the fuel cells 12 contact each other. Therefore, when the plurality of fuel cell 12 are stacked together, the outer peripheral portions of the first and second separators 11A, 11B are joined together by welding, etc. to form a single joint separator, and the joint separator is stacked on the frame equipped MEA 14.

The first separator 11A includes a fuel gas flow field 28 (one of reactant gas flow fields 26) as a passage of the fuel gas on its surface 11Aa facing the anode 22 of the frame equipped MEA 14. The fuel gas flow field 28 includes straight flow grooves (or wavy flow grooves) formed between a plurality of ridges 29 extending on the first separator 11A in the direction indicated by the arrow B (horizontal direction).

The second separator 11B has an oxygen-containing gas flow field 30 (reactant gas flow field 26) as a passage of the oxygen-containing gas on its surface 11Ba facing the cathode 24 of the frame equipped MEA 14 (in FIG. 1, for convenience, the flow direction of the oxygen-containing gas is shown on the cathode 24). The oxygen-containing gas flow field 30 comprises straight flow grooves (or wavy flow grooves) formed between a plurality of ridges 31 extending on the second separator 11B in the direction indicated by the arrow B (horizontal direction).

Further, a coolant flow field 32 as a passage of the coolant (e.g., water) is formed between the surfaces 11Ab, 11Bb of the first separator 11A and the second separator 11B which contact each other. When the first separator 11A and the second separator 11B are stacked together, the coolant flow field 32 is formed between the back surface of the fuel gas flow field 28 of the first separator 11A and the back surface of the oxygen-containing gas flow field 30 of the second separator 11B.

Further, the fuel cell 12 (the first separator 11A, the second separator 11B, and the resin frame member 18) includes a plurality of fluid passages 36 for allowing fluid to flow in the stacking direction (indicated by the arrow A). Fuel gas passages 38 (a fuel gas supply passage 38a and fuel gas discharge passages 38b) are passages of a fuel gas such as a hydrogen gas. Oxygen-containing gas passages 40 (an oxygen-containing gas supply passage 40a and oxygen-containing gas discharge passages 40b) are passages of an oxygen-containing gas such as the air. Coolant passages 42 (coolant supply passages 42a and coolant discharge passages 42b) are passages of a coolant such as water.

More specifically, at one end of the fuel cell 12 in the long side direction (end on the side indicated by the arrow B2), as the fluid passages 36, one fuel gas supply passage 38a, two oxygen-containing gas discharge passages 40b and two coolant discharge passages 42b) are provided. One fuel gas supply passage 38a, the two oxygen-containing gas discharge passages 40b, and the two coolant discharge passages 42b extend through each of the first separator 11A, the second separator 11B, and the resin frame member 18 in the direction indicated by the arrow A.

The fuel gas supply passage 38a is formed at the center of the fluid passages 36 arranged in the five upper/lower direction (in the direction indicated by the arrow C). The fuel gas supply passage 38a is connected to the fuel gas flow field 28 of the first separator 11A, and allows the fuel gas to flow into the fuel gas flow field 28.

The two coolant discharge passages 42b are positioned adjacent to, and above and below the fuel gas supply passage 38a, and the fuel gas supply passage 38a is formed at a position between two coolant discharge passages 42b. Each of the coolant discharge passages 42b is connected to the coolant flow field 32 between the first and second separators 11A, 11B, and allows the coolant to flow out of the coolant flow field 32.

The two oxygen-containing gas discharge passages 40b are disposed above the upper coolant discharge passage 42b and below the lower coolant discharge passage 42b, and the fuel gas supply passage 38a and the two coolant discharge passages 42b are formed between the two oxygen-containing gas discharge passages 40b. Each of the oxygen-containing gas discharge passage 40b is connected to the oxygen-containing gas flow field 30 of the second separator 11B, and allows the oxygen-containing gas to flow out of the oxygen-containing gas flow field 30.

At the other end of the fuel cell 12 in the long side direction (end close to the side in the direction indicated by the arrow B1), as the fluid passages 36, two fuel gas discharge passages 38b, one oxygen-containing gas supply passage 40a, and two coolant supply passages 42a are provided. The two fuel gas discharge passages 38b, the one oxygen-containing gas supply passage 40a, and two coolant supply passages 42a extend through each of the first separator 11A, the second separator 11B, and the resin frame member 18 in the direction indicated by the arrow A.

The oxygen-containing gas supply passage 40a is formed at the center of the five fluid passages 36 arranged in the upper/lower direction (direction indicated by the arrow C). The oxygen-containing gas supply passage 40a is connected to the oxygen-containing gas flow field 30 of the second separator 11B, and allows the oxygen-containing gas to flow into the oxygen-containing gas flow field 30.

The two coolant supply passages 42a are positioned adjacent to, and above and below the oxygen-containing gas supply passage 40a, and the oxygen-containing gas supply passage 40a is formed at a position between the two coolant supply passages 42a. Each of the coolant supply passages 42a is connected to the coolant flow field 32 between the first and second separators 11A, 11B, and allows the coolant to flow into the coolant flow field 32.

The two fuel gas discharge passages 38b are disposed above the upper coolant supply passage 42a and below the lower coolant supply passage 42a, respectively, and the oxygen-containing gas supply passage 40a and the two coolant supply passages 42a are formed between the two fuel gas discharge passages 38b. Each of the fuel gas discharge passages 38b is connected to the fuel gas flow field 28 of the first separator 11A, and allows the fuel gas to flow out of the fuel gas flow field 28.

Each of the fluid passages 36 (the fuel gas supply passage 38a, the fuel gas discharge passages 38b, the oxygen-containing gas supply passage 40a, the oxygen-containing gas discharge passages 40b, the coolant supply passages 42a, the coolant discharge passages 42b) has a polygonal shape such as a substantially hexagonal shape in a plan view. The shape of the fluid passages 36 is not limited specially. For example, the fluid passages 36 may have a triangular shape or a quadrangular shape. Further, the position and the number of the fluid passages 36 may be determined as necessary depending on the specification required for the fuel cell 12. Further, the fuel cell 12 (the first separator 11A, the second separator 11B, and the resin frame member 18) may include, as the other fluid passages 36, a drain hole (not shown) for discharging water produced during power generation, an air release hole for the coolant, and/or a drain hole for the coolant.

Figure 2A:
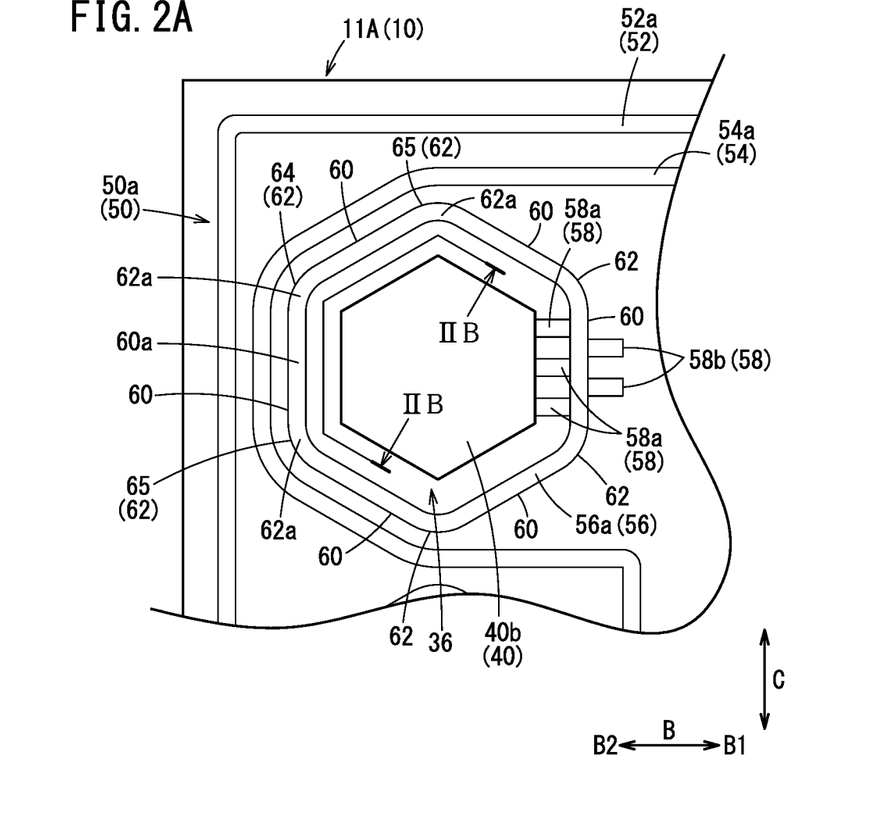
FIG. 2A is a plan view in which an oxygen-containing gas discharge passage of a first separator is enlarged.

Then, as shown in FIGS. 1 and 2A, in the separator 10 according to the embodiment of the present invention, a base part 48 (separator body) which extends in the form of a surface to form the reactant gas flow field 26 has a plurality of beads 50 facing the MEA 16 and protruding in the direction indicated by the arrow A. It should be noted that FIG. 2A is a plan view where the first separator 11A on the side indicated by the arrow B2 and the upper oxygen-containing gas discharge passage 40b are enlarged for showing the bead 50 as a representative example.

Each of the beads 50 is continuous with the base part 48. A rubber seal (not shown), etc. may be provided at the top part of each of the beads 50. In the state where the plurality of fuel cells 12 are stacked together (in the state where the fuel cell stack is formed), each of the beads 50 faces and pressed against each of the beads 50 of the separators 10 on opposite sides through the resin frame member 18 in the stacking direction to form a seal.

Specifically, as the bead 50, the first separator 11A includes a first bead 50a protruding from the surface 11Aa toward the resin frame member 18. The first bead 50a includes a first outer bead 52a provided around an area adjacent to the outer edge of the first separator 11A, and a first inner bead 54a provided inside the first outer bead 52a and surrounding the fuel gas flow field 28, the fuel gas passages 38, and the oxygen-containing gas passages 40. Further, the first bead 50a includes first passage beads 56a surrounding the plurality of fluid passages 36 (the fuel gas passages 38, the oxygen-containing gas passages 40, the coolant passages 42), respectively.

As the bead 50, the second separator 11B includes a second bead 50b protruding from the surface 11Ba toward the resin frame member 18. The second bead 50b includes a second outer bead 52b provided around an area adjacent to the outer edge of the second separator 11B, and a second inner bead 54b provided inside the second outer bead 52b and surrounding the oxygen-containing gas flow field 30, the fuel gas passages 38, and the oxygen-containing gas passages 40. Further, the second bead 50b includes second passage beads 56b surrounding the plurality of fluid passages 36 (the fuel gas passages 38, the oxygen-containing gas passages 40, the coolant passages 42), respectively.

A plurality of bridge sections 58 extending by the short distance in the direction indicated by the arrow B are provided in each of the plurality of passage beads 56 (the first passage bead 56a and the second passage bead 56b). Specifically, the plurality of bridge sections 58 include a plurality of inner bridges 58a (three inner bridges 58a in FIG. 2A) provided between a plurality of fluid passages 36 and a plurality of passage beads 56 and a plurality of outer bridges 58b (two outer bridges 58b in FIG. 2A) provided outside the respective passage beads 56. The inner bridges 58a allow the fluid to flow between the adjacent fluid passages 36 and the passage bead 56, respectively.

On the other hand, each of the outer bridges 58b has an opening (not shown) at the protruding end in the direction indicated by the arrow B depending on the type of the separator 10 and the fluid passage 36. Specifically, the first separator 11A has an opening in each of the outer bridges 58b corresponding to the fuel gas passages 38, and no opening is provided in each of the outer bridges 58b corresponding to the oxygen-containing gas passages 40. In the structure, in the first separator 11A, the fuel gas flows between the fuel gas flow field 28 and the fuel gas passages 38 through the bridge section 58. On the other hand, the second separator 11B has an opening in each of the outer bridge 58b in correspondence with the oxygen-containing gas passages 40, and no opening is provided in each of the outer bridges 58b in correspondence with the fuel gas passages 38. Therefore, the second separator 11B allows the oxygen-containing gas to flow between the oxygen-containing gas flow field 30 and the oxygen-containing gas passages 40.

Further, each of the bridge sections 58 is also arranged inside inner beads 54 (the first inner bead 54a and the second inner bead 54b) positioned between the coolant flow field 32 and the coolant passages 42 (hereinafter referred to as the coolant bridge 58c: see FIG. 1). That is, in the state where the first separator 11A and the second separator 11B are stacked together, the coolant flow field 32 and the coolant passages 42 are connected together by the inner bridge 58a, the outer bridge 58b, and the coolant bridge 58c.

The height of each of the beads 50 relative to the base part 48 is higher than the height of each of the bridge sections 58 relative to the base part 48. In a state where the separators 10 are stacked together to form the fuel cells 12 or the fuel cell stack, each of the beads 50 is elastically deformed as a result of a load being applied in the stacking direction from the separators 10 on both sides of the bead 50 through the resin frame members 18.

Further, each of the passage beads 56 (bead 50) according to the embodiment of the present invention has, in plan view, a substantially hexagonal shape and has a size which is slightly larger than each of the fluid passages 36. That is, each of the passage beads 56 has straight sections 60 which extend straight to form side parts of a substantially hexagonal shape, and curved sections 62 which are continuous with the straight sections 60 and curved from the straight section 60 to form corners of the substantially hexagonal shape. It should be noted that the straight section 60 is not limited in having a zero curvature, and may have a small curvature. Further, though the curved section 62 is curved in an R shape (rounded shape) in the embodiment of the present invention, the curved section 62 may be formed in an L-bent shape.

Further, in a state before the frame equipped MEA 14 is stacked on the separator 10 (the first separator 11A and the second separator 11B), the height Hs of the straight section 60 and the height Hc of the curved section 62 are different from each other. More specifically, the straight section 60 and the curved section 62 have top parts 60a, 62a each having a circular arc shape in a cross sectional view (see FIG. 2B). Then, the height Hc from the base part 48 to the top part 62a of the curved section 62 is lower than the height Hs from the base part 48 to the top part 60a of the straight section 60.

Figure 3A:
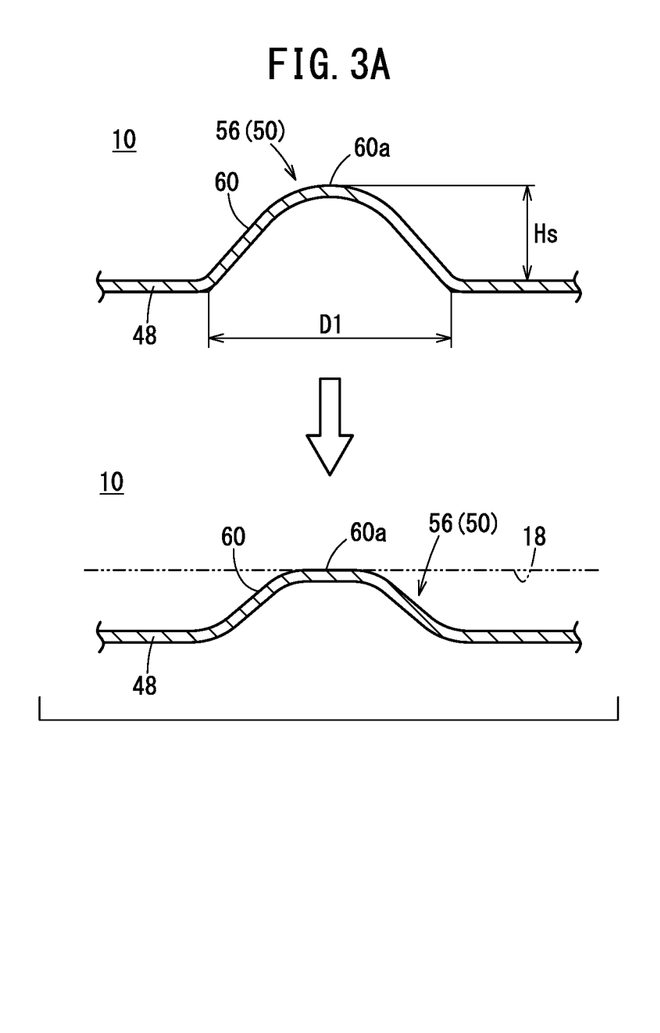
FIG. 3A is a cross sectional view showing a state before a straight section of the passage bead is sealed and a state where the straight section of the passage bead is sealed.
Figure 3B:
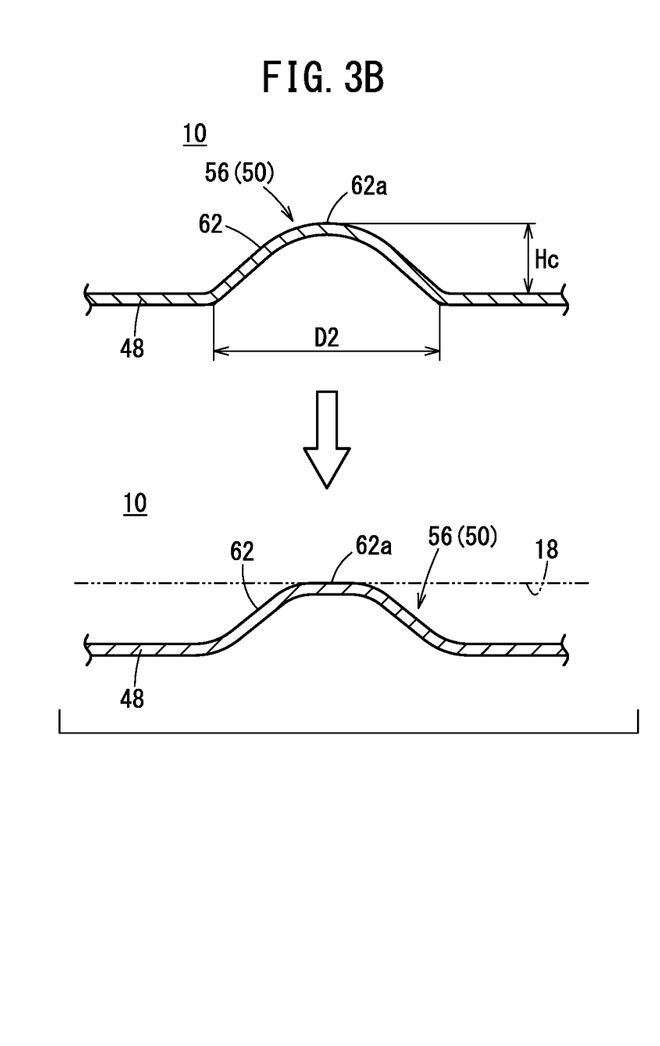
FIG. 3B is a cross sectional view showing a state before a curved section of the passage bead is sealed and a state where the curved section of the passage bead is sealed.

Further, as shown in FIGS. 3A and 3B, the space D1 at the root part of the straight section 60 and the space D2 at the root part of the curved section 62 are configured to have the same size. It should be noted that the space D1 at the root part of the straight section 60 and the space D2 at the root part of the curved section 62 need not necessarily have the relationship of D1=D2, and may have the relationship of D1<D2, for example. The thickness of a part of the separator 10 forming the straight section 60 and the thickness of a part of the separator 10 forming the curved section 62 are the same.

In a seal state where the separators 10 are stacked together to form a seal by the passage bead 56 of the first separator 11A and the passage bead 56 of the second separator 11B, the passage bead 56 of the first separator 11A and the passage bead 56 of the second separator 11B face each other, across the resin frame member 18 from each other, and press each other through the resin frame member 18. As a result, in the passage bead 56 of the first separator 11A and the passage bead 56 of the second separator 11B, each of the top part 60a of the straight section 60 and the top part 62a of the curved section 62 is elastically deformed into a flat shape. In this case, the modulus of elasticity of the top part 62a of the curved section 62 is higher than the modulus of elasticity of the top part 60a of the straight section 60. Therefore, elastic deformation of the top part 62a of the curved section 62 is less likely to occur than that of the top part 60a of the straight section 60. However, the height Hc of the curved section 62 before sealing shown in FIG. 3B is originally lower than the height Hs of the straight section 60 before sealing shown in FIG. 3A. Therefore, with a small elastic deformation amount, it is possible to position a portion of the resin frame member 18 supported by the curved section 62 at the same height as a portion of the resin frame member 18 supported by the straight section 60. As a result, in the passage bead 56, the surface pressure applied from the resin frame member 18 to the elastically-deformed straight section 60 in the seal state shown in FIG. 3A, and the surface pressure applied from the resin frame member 18 to the elastically-deformed curved section 62 in the seal state shown in FIG. 3B become substantially the same.

Figure 2B:
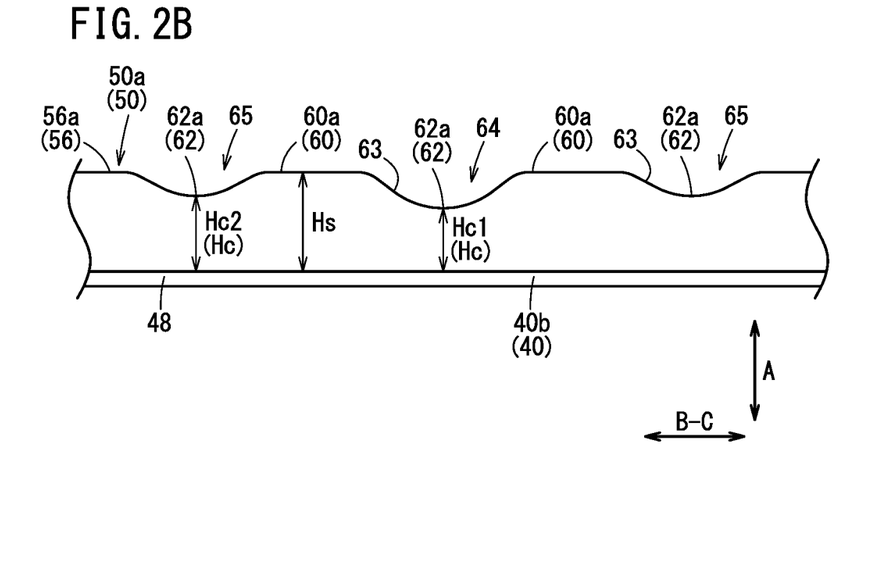
FIG. 2B is a view showing a passage bead, taken along a line IIB-IIB in FIG. 2A.

Further, the top part 60a of the straight section 60 and the top part 62a of the curved section 62 are continuous to each other to form a ridgeline of the passage bead 56 in a side view taken in the extending direction in which the passage bead 56 extends as shown in FIG. 2B. The ridgeline of the passage bead 56 changes smoothly in the extending direction in which the passage bead 56 extends.

Specifically, the ridgeline of the straight section 60 extends to have a flat portion (i.e., the height Hs is constant). On the other hand, the ridgeline of the curved section 62 (height Hc) is lowest at the central position (position closest to the corner part of the fluid passage 36). The ridgeline of the curved section 62 (height Hc) is gradually increased from this central position toward both sides of the straight section 60 in the extending direction. In FIG. 2B, though each of valleys 63 is present at the central position of the curved section 62, and has a circular arc shape, the valley 63 may have structure having a flat portion.

The ratio of the height Hc of the curved section 62 to the height Hs of the straight section 60 (height of the central position) may be designed as appropriate based on the surface pressure applied in the direction in which the passage bead 56 extends and/or the curvature of the curved section 62. For example, preferably, the ratio of the height Hc of the curved section 62 to the height Hs of the straight section 60 may be set in the range of about 70% to 95%. Further, the height Hc of the curved section 62 is higher than the height from the base part 48 to a top part (not shown) of the bridge section 58.

Further, preferably, the structure of reducing the height Hc of the curved section 62 to be lower than the height Hs of the straight section 60 is provided at a position adjacent to (closer to) the outer bead 52 in the passage bead 56. Elastic deformation of the passage bead 56 provided at a position close to the outer bead 52 does not occur easily, and variation in the surface pressure tends to be larger in comparison with the inside (closer to the reactant gas flow field 26). Therefore, by reducing the height Hc of the curved section 62 to be lower than the height Hs of the straight section 60, it becomes easier to achieve a uniform distribution of surface pressure over the entire passage bead 56 in the extending direction in which the passage bead 56 extends.

Further, in the case where the bead 50 has a plurality of the curved sections 62, the separator 10 may have a structure where the curved sections 62 have different heights Hc. That is, as shown in FIG. 2B, in the passage bead 56, the height Hc1 of the curved section 62 having a larger surface pressure (e.g., a first curved section 64) is configured to be lower than the height Hc2 of the curved section 62 having a smaller surface pressure (e.g., a second curved section 65). Concerning the surface pressure applied to the plurality of curved sections 62, a surface pressure in a case where the height of the bead 50 is constant is estimated by simulation (or the surface pressure is actually measured), and the obtained surface pressure can be used as the surface pressure applied to the plurality of curved sections 62.

The height of the plurality of curved sections 62 may be adjusted depending on the curvature of the curved sections 62 in a plan view. For example, preferably, in the bead 50, the height of the curved section 62 having a larger curvature (first curved section) is configured to be lower than the height of the curved section 62 having a smaller curvature (second curved section). The curved section 62 having a larger curvature has a larger modulus of elasticity and is less subject to significant elastic deformation, in comparison with the curved section 62 having a smaller curvature. Thus, by adjusting the heights of the curved sections, it is possible to achieve a more uniform distribution of surface pressure between the curved sections 62.

In the passage bead 56, the structure configured to reduce the height Hc of the curved section 62 to be lower the height Hs of the straight section 60 have been described with reference to FIG. 2B. However, as long as the bead 50 has the straight section 60 and the curved section 62, the structure is not limited to the passage bead 56. For example, it may be possible to adopt a structure where, in the outer bead 52 (the first outer bead 52a and the second outer bead 52b) and the inner bead 54 (the first inner bead 54a and the second inner bead 54b), the height Hc of the curved section 62 is lower than the height Hs of the straight section 60.

Figure 4A:
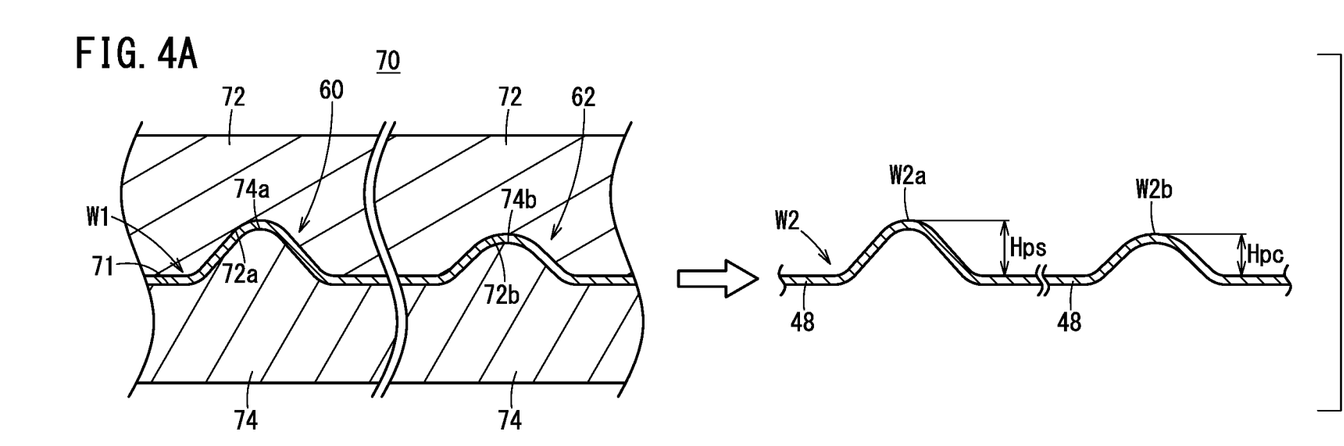
FIG. 4A is a view showing a press step of a method of producing a separator.
Figure 4B:
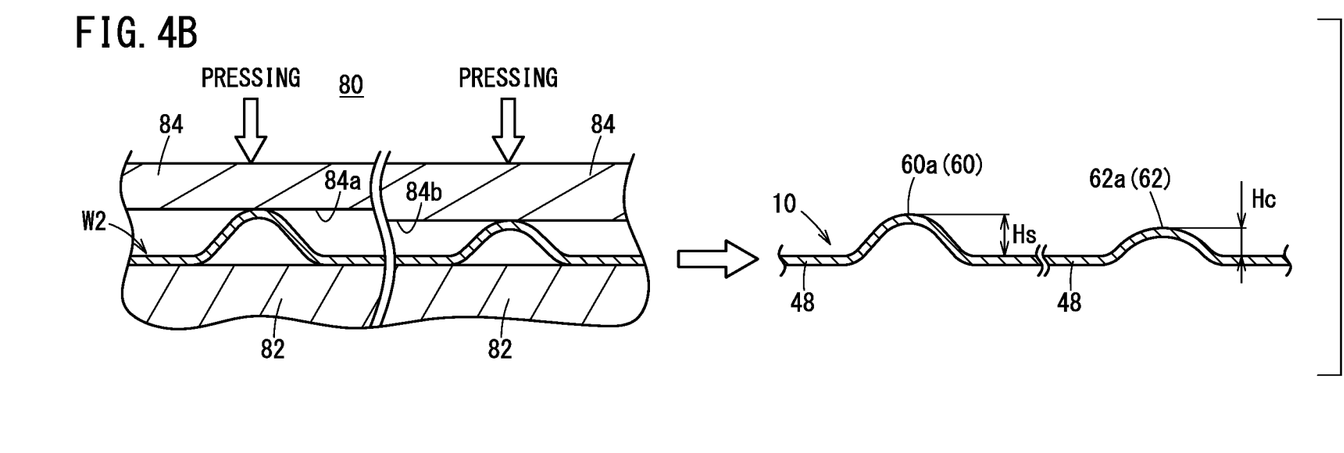
FIG. 4B is a view showing a compression step of the method of producing the separator.

Next, a method of producing the separator 10 (the first separator 11A and the second separator 11B) having the above bead 50 will be described. As shown in FIGS. 4A and 4B, in production of the separator 10, a press step of performing press processing for corrugating the separator 10, and a compression step of adjusting the height of the bead 50 after the press step are performed successively.

In the press step, using a press machine 70 having a movable die 72 and a fixed die 74, press processing is performed on a flat plate (first workpiece W1: the first workpiece W1 in a pressed state is shown in FIG. 4A), which is a base member of the separator 10. At a position where the passage bead 56 (bead 50) is to be formed, a press space 71 in correspondence with each of the straight section 60 and the curved section 62 is formed in the movable die 72 and the fixed die 74. Specifically, at a position where the straight section 60 is to be formed, the fixed die 74 has a protrusion 74a which protrudes by a large extent, and the movable die 72 has a recess 72a which is depressed by a large extent in correspondence with the protrusion 74a. On the other hand, at a position where the curved section 62 is to be formed, the fixed die 74 has a protrusion 74b which is lower than the protrusion 74a, and the movable die 72 has a recess 72b which is shallower than the recess 72a.

Therefore, in the second workpiece W2 pressed between the movable die 72 and the fixed die 74 by the press machine 70, the position where the passage bead 56 is to be formed includes a protrusion shape W2a having a press height Hps at the position where the straight section 60 is to be formed, and a protrusion shape W2b having a press height Hpc at the position where the curved section 62 is to be formed. In this case, the press height Hps is slightly higher than the final height Hs of the straight section 60, and likewise, the press height Hpc is slightly higher than the final height Hc of the curved section 62.

In the compression step, a compression machine 80 having a fixed base 82 and a pressing plate 84 (pressing element) is used. The second workpiece W2 is disposed on the fixed base 82. The pressing plate 84 is configured to move closer to and away from the fixed base 82. Further, the pressing surface of the pressing plate 84 for pressing the second workpiece W2 has a flat stepped shape including multiple steps in correspondence with the straight section 60 and the curved section 62 at the position where the passage bead 56 (bead 50) is to be formed. That is, in the pressing plate 84, the pressing surface 84b at the position where the curved section 62 is to be formed protrudes more toward the fixed base 82 in comparison with the pressing surface 84a at the position where the straight section 60 is to be formed.

In the compression machine 80, the pressing plate 84 is moved forward to the second workpiece W2 fixed to the fixed base 82 to press the protrusion shapes W2a, W2b of the second workpiece W2, whereby the height of the bead 50 of the separator 10 is adjusted. That is, in the method of producing the separator 10, after the compression step, the separator 10 having the passage bead 56 where the height Hc of the curved section 62 is lower than the height Hs of the straight section 60 is completed.

It should be noted that in the method of producing the separator 10, the heights of the straight section 60 and the curved section 62 of the bead 50 are not limited as described above, and various production methods can be adopted. For example, in the method of producing the separator 10, only the press step may be performed to directly obtain the bead 50 where the height Hs of the straight section 60 and the height Hc of the curved section 62 are different, by a single step. Hereinafter, several other methods of producing the separator 10 will be described with reference to FIGS. 5A to 6B.

Figure 5A:
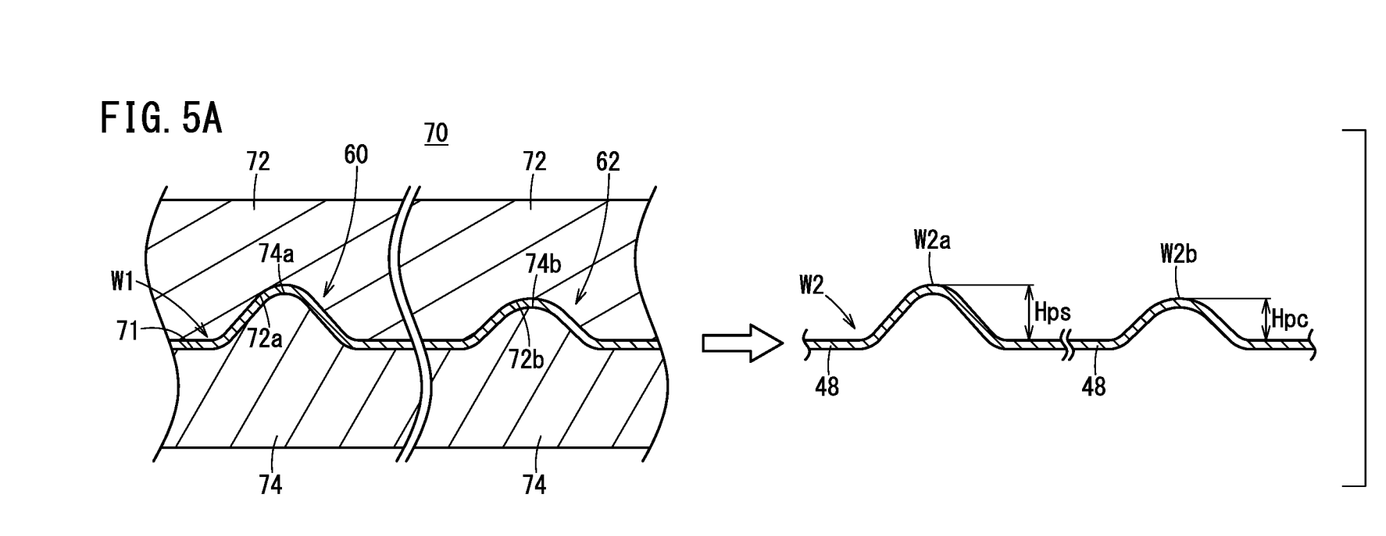
FIG. 5A is a view showing a press step of producing a separator according to a first modified embodiment.
Figure 5B:
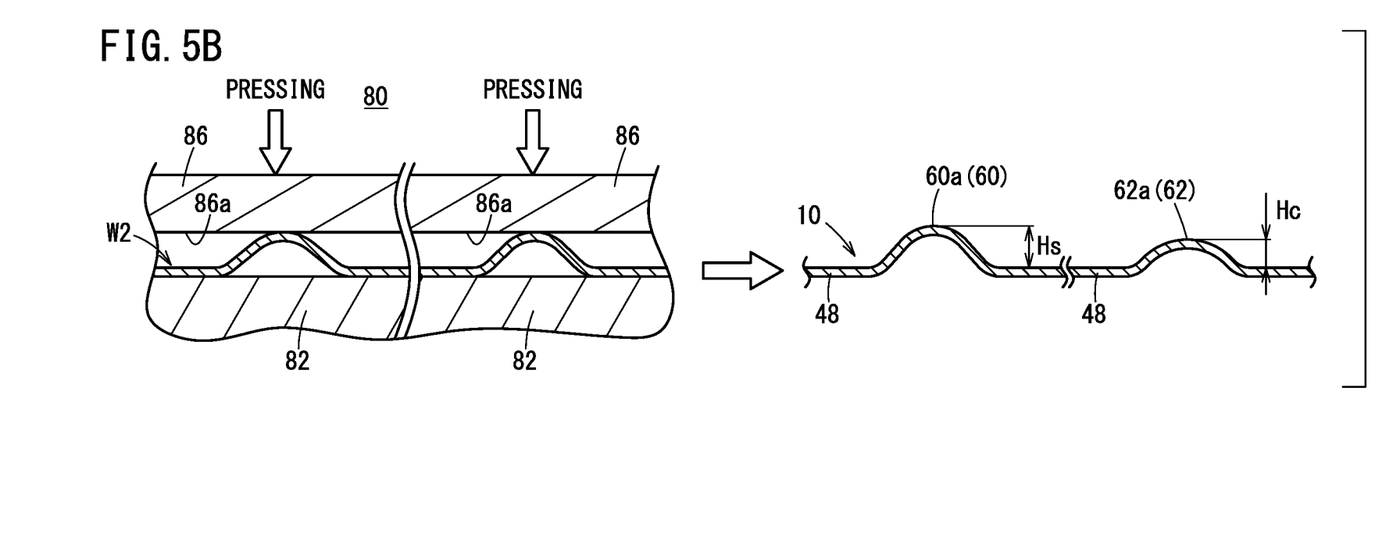
FIG. 5B is a compression step of the method of producing the separator according to the first modified embodiment.

In a method of producing the separator 10 according to a first modified embodiment shown in FIGS. 5A and 5B, as for the press step, the same press machine 70 as shown in FIG. 4A is used to machine the first workpiece W1. On the other hand, in the compression step, the height adjustment of the passage bead 56 (bead 50) of the separator 10 is performed using a pressing plate 86 having a non-stepped pressing surface 86a.

In this manner, even in the case where the pressing surface 86a does not have any steps, by suitably setting the pressing time for pressing the second workpiece W2 by the pressing plate 86, after the pressing plate 86 has been retracted, it is possible to restore the protruding shape of the passage bead 56 elastically. That is, in the method of producing the separator 10, even in the case where the pressing plate 86 having a flat pressing surface 86a is used in the compression step, it is possible to form the passage bead 56 where the height Hc of the curved section 62 is lower than the height Hs of the straight section 60.

Figure 6A:
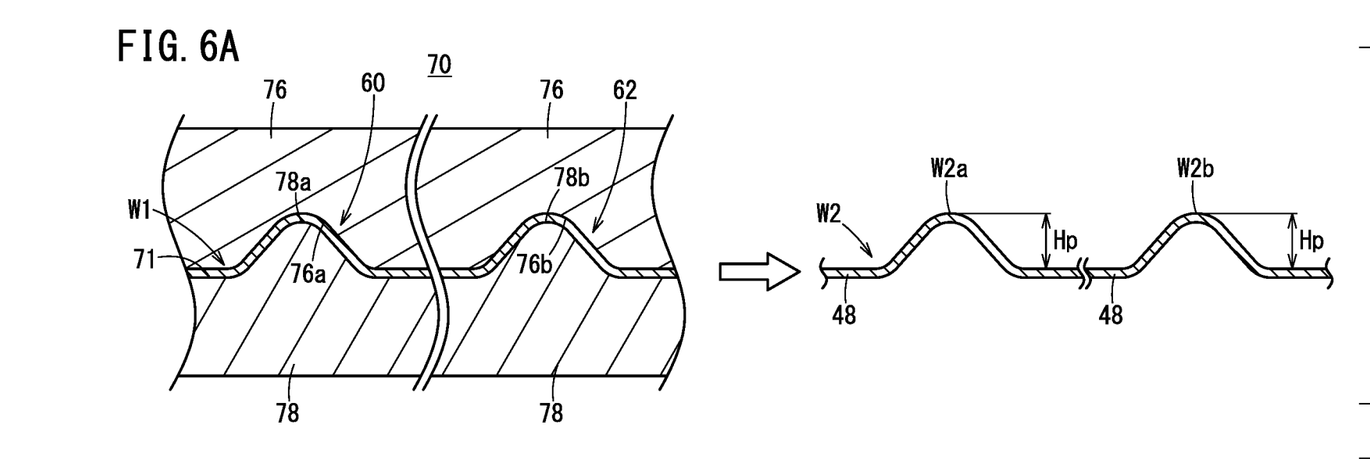
FIG. 6A is a view showing a press step of a method of producing a separator according to a second modified embodiment.
Figure 6B:
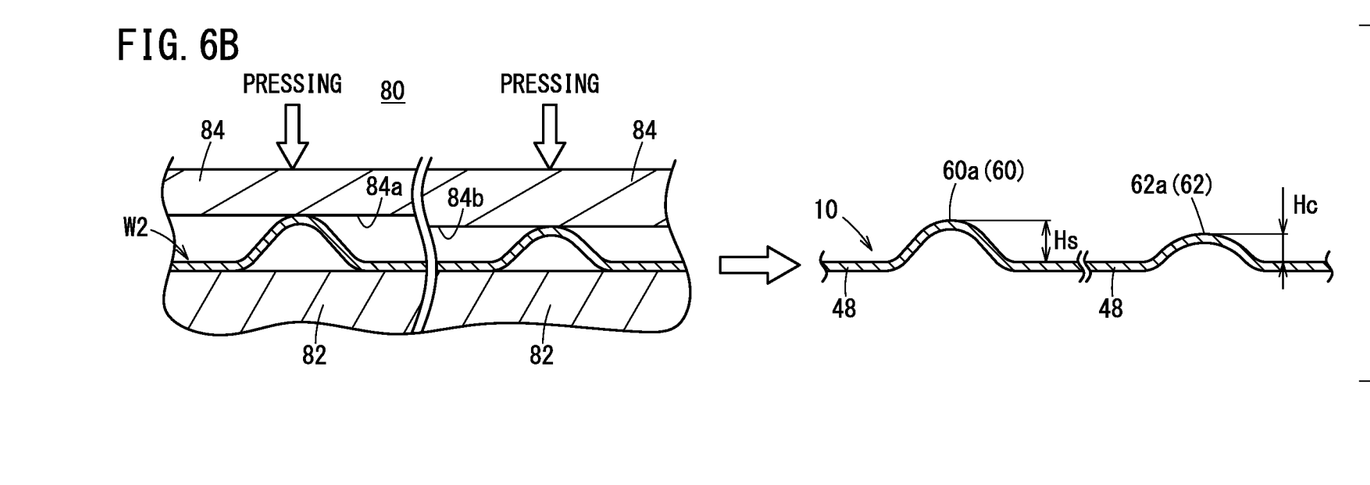
FIG. 6B is a view showing a compression step of the method of producing the separator according to the second modified embodiment.

Further, in a method of producing the separator 10 according to a second modified embodiment shown in FIGS. 6A and 6B, in the press step, protrusion shapes W2a, W2b having the same press height Hp are formed at the position where the straight section 60 is to be formed and the position where the curved section 62 is to be formed. That is, in the movable die 76, a recess 76a at the position where the straight section 60 is to be formed and a recess 76b at the position where the curved section 62 is to be formed have the same shape, and in a fixed die 78, a protrusion 78a at the position where the straight section 60 is to be formed and a protrusion 78b at a position where the curved section 62 is to be formed have the same shape.

Therefore, after the press step, the second workpiece W2 has the protrusion shapes W2a, W2b having the same press height Hp at the position where the passage bead 56 is to be formed. In the compression step, the height adjustment of the second workpiece W2 is performed in a manner that the height Hc of the curved section 62 becomes lower than the height Hs of the straight section 60. Specifically, using the fixed base 82 and the pressing plate 84 as in the case of the compression machine 80 shown in FIG. 4B, the protrusion shapes W2a, W2b of the second workpiece W2 are pressed. At this time, the compression machine 80 performs pressing for an appropriate pressing time so as to shape the passage bead 56 in a manner that the height Hc of the curved section 62 is lower than the height Hs of the straight section 60. In this manner, also in the method of producing the separator 10 according to the second modified embodiment, the same separator 10 as in the production method shown in FIGS. 4A and 4B can be obtained.

The separator 10 according to the embodiment of the present invention basically has the structure as described above. Hereinafter, operation and advantages of the separator 10 will be described.

As shown in FIG. 1, a load is applied to the separators 10 of the fuel cell 12 forming the fuel cell stack in the stacking direction (direction indicated by the arrow A). Specifically, the bead 50 contacts the resin frame member 18, and the bead 50 is elastically deformed to form a seal (see also FIGS. 3A and 3B) when the pair of separators 10 (the first separator 11A and the second separator 11B) on both sides of the resin frame member 18 are pressed against each other.

As a result, among the passage beads 56 of the first separator 11A, the passage beads 56 surrounding the fuel gas passages 38 connect the fuel gas flow field 28 and the fuel gas passages 38 through the inner bridges 58a and the outer bridges 58b having the openings. Further, the passage beads 56 surrounding the oxygen-containing gas passages 40 and the coolant passages 42, of the first separator 11A disconnect the oxygen-containing gas flow field 30 from the oxygen-containing gas passages 40, and disconnect the coolant flow field 32 from the coolant passages 42.

The passage beads 56 surrounding the oxygen-containing gas passages 40, among the passage beads 56 of the second separator 11B connect the oxygen-containing gas flow field 30 and the oxygen-containing gas passages 40 through the inner bridges 58a and the outer bridges 58b having the openings. Further, the passage beads 56 surrounding the fuel gas passages 38 and the coolant passages 42, of the second separator 11B disconnect the fuel gas flow field 28 from the fuel gas passages 38, and disconnect the coolant flow field 32 and from coolant passages 42.

Then, a fuel gas, an oxygen-containing gas, and a coolant are supplied from the outside of the fuel cell stack to the fuel cell stack (in each of the fuel cells 12). In each of the fuel cells 12, the fuel gas flows through the fuel gas supply passage 38a in the stacking direction (direction indicated by the arrow A), and then, the fuel gas flows into the fuel gas flow field 28. The fuel gas flows along the fuel gas flow field 28 in the direction indicated by the arrow B, and the fuel gas is supplied to the anode 22 of the MEA 16. Further, in each of the fuel cells 12, the oxygen-containing gas flows through the oxygen-containing gas supply passage 40a in the stacking direction (direction indicated by the arrow A), and the oxygen-containing gas flows into the oxygen-containing gas flow field 30. The oxygen-containing gas flows along the oxygen-containing gas flow field 30 in the direction indicated by the arrow B, and the oxygen-containing gas is supplied to the cathode 24 of the MEA 16.

Then, the MEA 16 performs power generation by electrochemical reactions of the fuel gas supplied to the anode 22 and the oxygen-containing gas supplied to the cathode 24. After the fuel gas flows through the fuel gas flow field 28, the fuel gas flows out of the fuel gas flow field 28 into the fuel gas discharge passages 38b. The fuel gas flows through the fuel gas discharge passages 38b in the stacking direction (direction indicated by the arrow A), and then, the fuel gas is discharged to the outside of the fuel cell stack. In the meanwhile, after the oxygen-containing gas flows through the oxygen-containing gas flow field 30, the oxygen-containing gas flows out of the oxygen-containing gas flow field 30 into the oxygen-containing gas discharge passages 40b. The oxygen-containing gas flows through the oxygen-containing gas discharge passages 40b indicated by the arrow A, and then, the oxygen-containing gas is discharged to the outside of the fuel cell stack.

Further, in each of the fuel cells 12, the coolant flows through the coolant supply passages 42a in the stacking direction (direction indicated by the arrow A), and the coolant flows into the coolant flow field 32. The coolant moves along the coolant flow field 32 in the direction indicted by the arrow B to adjust the temperature of the frame equipped MEA 14. After the coolant flows through the coolant flow field 32, the coolant flows out of the coolant flow field 32 into the coolant discharge passages 42b. Then, the coolant flows through the coolant discharge passages 42b in the direction indicated by the arrow A, and the coolant is discharged to the outside of the fuel cell stack.

In this regard, as shown in FIG. 2B, at the time of producing the separator 10, the passage bead 56 is formed in a manner that the height Hc of the curved section 62 becomes lower than the height Hs of the straight section 60. As a result, in the separator 10, it is possible to reduce variation of the surface pressure applied to each of the passage beads 56 in the seal state.

Figure 7A:
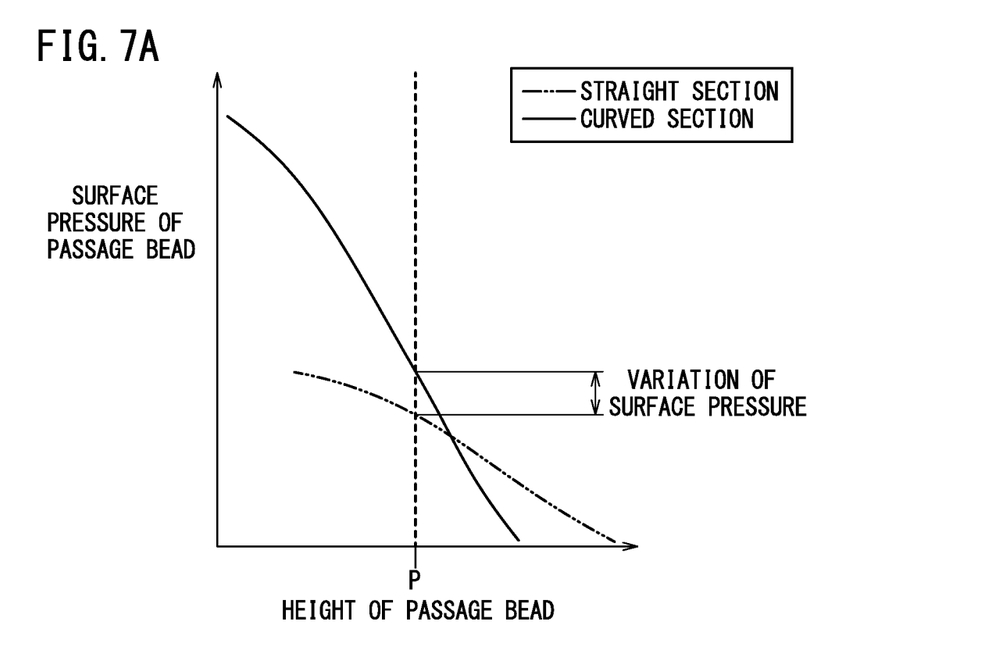
FIG. 7A is a graph showing height surface vs pressure characteristics of a passage bead where the straight section and the curved section have different heights.
Figure 7B:
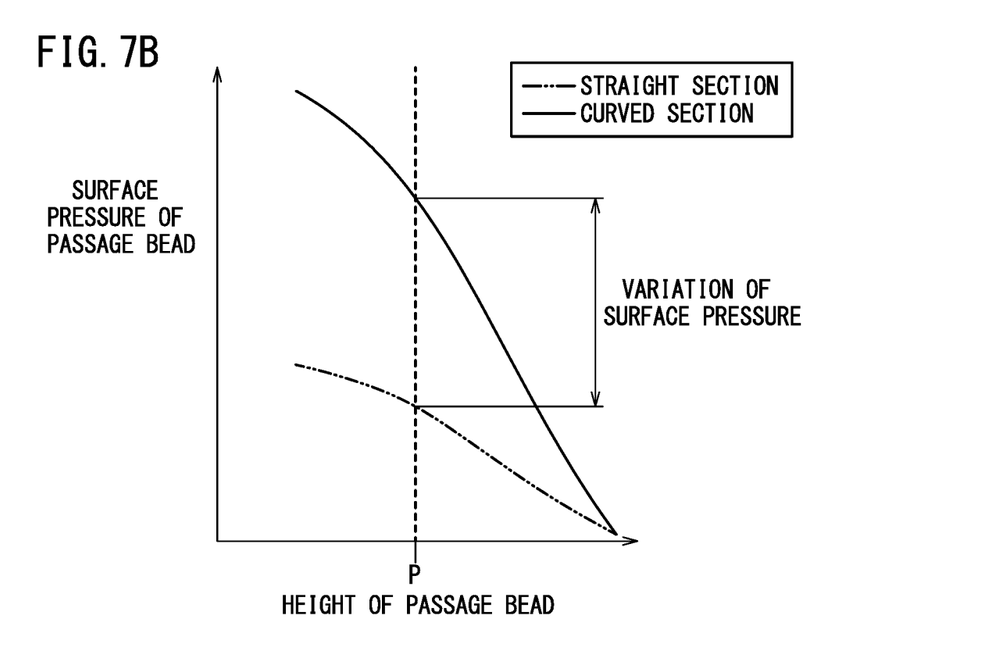
FIG. 7B is a graph showing a height vs surface pressure characteristics of the passage bead where the straight section and the curved section have a constant height.

Next, the height-surface pressure characteristics of the passage bead 56 will be described with reference to FIGS. 7A and 7B. In FIGS. 7A and 7B, the horizontal axis represents the height of the passage bead 56, and the vertical axis represents the surface pressure applied to the passage bead 56. In this case, the height-surface pressure characteristics of the straight section 60 and the height-surface pressure characteristics of the curved section 62 have different change rates. Specifically, in the height-surface pressure characteristics of the curved section 62, as the height of the passage bead 56 decreases with pressing, the surface pressure increases by a large extent. In contrast, in the height-surface pressure characteristics of the straight section 60, as the height of the passage bead 56 decreases with pressing, the surface pressure increases by a small extent. That is, the spring constant of the curved section 62 is larger than the spring constant of the straight section 60.

Therefore, as shown in FIG. 7B, in a case where the height Hs of the straight section 60 and the height Hc of the curved section 62 are the same at a point where the surface pressure is near zero (i.e., at the time of production in the state where no load is applied), when the bead is elastically deformed to a height position P where the seal state is achieved by an applied load, variation in the surface pressure becomes large.

In contrast, as shown in FIG. 7A, in the separator 10 according to the embodiment of the present invention, in the state where the surface pressure is near zero (at the time of production in the state where no load is applied), the height Hc of the curved section 62 is lower than the height Hs of the straight section 60. Therefore, when the passage bead 56 is elastically deformed to the height position P where the seal state is achieved by an applied load, it is possible to reduce variation in the surface pressure.

Figure 8:
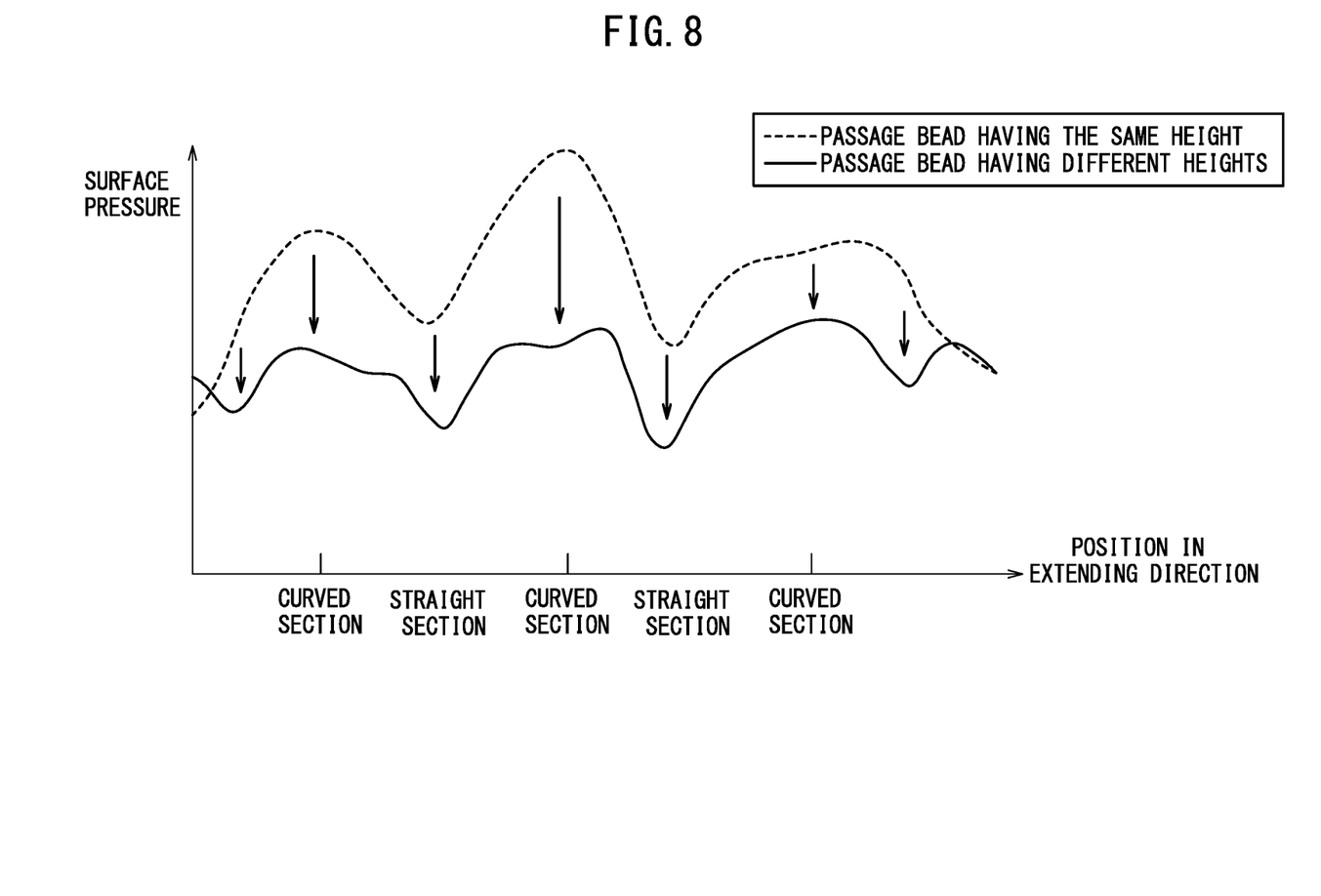
FIG. 8 is a graph illustrating the position of the passage bead in a direction in which the passage bead extends and the surface pressure applied to the passage bead.

Further, as shown in a graph of FIG. 8, in the conventional passage bead where the straight section 60 and the curved section 62 have the same height, variation in the surface pressure is large in the extending direction in which the straight sections 60 and the curved sections 62 are positioned alternately. It should be noted that in the graph in FIG. 8, the horizontal axis indicates the position in the extending direction in which the passage bead 56 extends, and the vertical axis indicates the surface pressure applied to the passage bead 56. The surface pressure is estimated by simulation.

In contrast, in the passage bead 56 according to the embodiment of the present invention, since the straight section 60 and the curved section 62 having different heights are provided (the height Hc of the curved section 62 is lower than the height Hs of the straight section 60), variation in the surface pressure becomes small in the extending direction. As described above, since variation in the surface pressure is small, it is possible to achieve a stable seal performance between the passage bead 56 and the frame equipped MEA 14 to a greater extent.

It should be noted that the present invention is not limited to the above described embodiments, and various modifications can be made in line with the gist of the present invention. For example, in the separator 10, the top part of the bead 50 (the straight section 60 and the curved section 62) is not limited to having a circular arc shape in cross section. For example, the top part of the bead 50 may have a trapezoidal shape in cross section. Even in the case where the top part of the bead 50 has the trapezoidal shape, by reducing the height Hc of the curved section 62 to be lower than the height Hs of the straight section 60, the same advantages as described above can be obtained.

The technical concepts and the advantages that can be understood from the above embodiments will be described below.

According to a first aspect of the present invention, the separator 10 is provided. The separator 10 is configured to be stacked on each of both surfaces of the membrane electrode assembly 16 to thereby form the fuel cell 12. The membrane electrode assembly 16 includes the electrolyte membrane 20 and the electrodes (the anode 22 and the cathode 24) provided on both surfaces of the electrolyte membrane 20. The separator 10 includes the base part 48 extending in the form of a surface, and the bead 50 continuous with the base part 48 and protruding from the base part 48 in a stacking direction to form a seal. The bead 50 includes, in plan view, the straight section 60 extending straight and the curved section 62 continuous with the straight section 60 and curved from the straight section 60. The height Hc from the base part 48 to the top part 62a of the curved section 62 is lower than the height Hs from the base part 48 to the top part 60a of the straight section 60.

With the above configuration, in the separator 10, with the simple structure where the height Hc of the curved section 62 is lower than the height Hs of the straight section 60, it is possible to reduce variation in the surface pressure in the bead 50 having the straight section 60 and the curved section 62. In the bead 50, in the seal state, the surface pressure of the curved section 62 tends to become higher than the surface pressure of the straight section 60. In the present invention, by forming the height of the curved section 62 to be lower than the height of the straight section 60 beforehand, it is possible to reduce variation in the surface pressure in the seal state, and achieve a uniform distribution of surface pressure. Therefore, in the separator 10, it is possible to stabilize the seal performance of the bead 50 to a greater extent.

Further, the height Hc from the base part 48 to the top part 62a of the curved section 62 is gradually increased from the central position of the curved section 62 in the extending direction in which the curved section 62 extends, toward the straight section 60 on each of both sides of the curved section in the extending direction. In the structure, in the seal state, the bead 50 can stably receive the surface pressure from the member which faces the bead 50, along the extending direction. Accordingly, it is possible to suppress variation in the surface pressure in the straight section 60 and the curved section 62 to a greater extent.

Further, the separator 10 includes the fluid passage 36 as a passage of fluid in the stacking direction, and the bead 50 includes the passage bead 56 provided outside the fluid passage 36 to surround the fluid passage 36, and the passage bead 56 includes the straight section 60 and the curved section 62. By the passage bead 56, in the separator 10, it is possible to suitably seal the periphery of the fluid passage 36.

Further, the fluid passage 36 has a polygonal shape in plan view, and the passage bead 56 includes the straight section 60 at a position adjacent to a side part of the fluid passage 36, and includes the curved section 62 at a positon adjacent to a corner part of the fluid passage 36. In the structure, in the seal state, the passage bead 56 can suppress variation in the surface pressure in the peripheral direction of the fluid passage 36 having the polygonal shape.

Further, the bead 50 includes the outer bead 52 outside the passage bead 56, in the outer peripheral portion of the separator 10, and the structure configured to reduce the height Hc of the curved section 62 to be lower than the height Hs of the straight section 60 is provided at a position adjacent to the outer bead 52 in the passage bead 56. Accordingly, the passage bead 56 can improve variation in the surface pressure at the position adjacent to the outer bead 52.

Further, the bead 50 includes the plurality of curved sections 62, and the height Hc1 from the base part 48 to the top part 62a in the first curved section 64 among the plurality of curved sections 62 and the height Hc2 from the base part 48 to the top part 62a in the second curved section 65 among the plurality of curved sections 62 are different from each other, In the structure, in the separator 10, among the plurality of curved sections 62, it is possible to lower the height of the curved section 62 located at the position where the surface pressure becomes higher in the seal state, and it is possible to suppress variation in the surface pressure to a greater extent.

Further, according to a second aspect of the present invention, the separator 10 is provided that is configured to be stacked on each of both surfaces of the membrane electrode assembly 16 to thereby form the fuel cell 12. The membrane electrode assembly 16 includes the electrolyte membrane 20, and electrodes 22, 24 provided on both surfaces of the electrolyte membrane 20. The separator 10 includes the base part 48 extending in the form of the surface, and the bead 50 continuous with the base part 48 and protruding from the base part 48 in a stacking direction to form a seal. The bead 50 includes at least the two curved sections 62 in plan view, and among the curved sections, the height of one curved section 62 having a larger curvature is lower than the height of another curved section 62 having a smaller curvature. In the structure, in the separator 10, in the seal state of the bead 50 including the plurality of curved section 62 having difference curvatures, it is possible to reduce variation in the surface pressure between the curved sections 62 (the curved section 62 having large curvature and the curved section 62 having small curvature).

Further, according to a third aspect of the present invention, the method of producing the separator 10 is provided, and the separator 10 is configured to be stacked on each of both surfaces of the membrane electrode assembly 16 to thereby form the fuel cell 12. The membrane electrode assembly 16 includes the electrolyte membrane 20 and the electrodes (the anode 22 and the cathode 24) provided on both surfaces of the electrolyte membrane 20. The separator 10 includes the base part 48 extending in the form of a surface, and the bead 50 continuous with the base part 48 and protruding from the base part 48 in a stacking direction to form a seal. The bead 50 includes, in plan view, the straight section 60 extending straight and the curved section 62 continuous with the straight section 60 and curved from the straight section 60. When the separator is produced, the bead 50 is formed in a manner that the height Hc from the base part 48 to the top part 62a of the curved section 62 is lower than the height Hs from the base part 48 to the top part 60a of the straight section 60. In this manner, in the method of producing the separator 10, by forming the bead 50 including the straight section 60 and the curved section 62 having different heights, in the seal state, it is possible to reduce variation in the surface pressure in the extending direction in which the bead 50 extends.

Further, the method includes the press step of pressing the first workpiece W1 by the movable die 72, 76 and the fixed die 74, 78 to form the second workpiece W2 having the protrusion shape W2a, W2b at a position where the bead 50 is to be formed, and the compression step of pressing the second workpiece W2 by the pressing element (pressing plate 84, 86) to thereby adjust the height of the bead 50. In the structure, in the method of producing the separator 10, it is possible to accurately adjust the height Hs of the straight section 60 and the height Hc of the curved section 62, of the bead 50.

Further, in the press step, the press height Hpc of the protrusion shape W2b at a position where the curved section 62 is to be formed, is formed to be lower than the press height Hps of the protrusion shape W2a at a position where the straight section 60 is to be formed. Owing to the height difference which is generated in the press step as described above, in the method of producing the separator 10, it is possible to easily adjust the height of the straight section 60 and the curved section 62, of the bead 50.

Further, in the press step, the protrusion shape W2a at a position where the straight section 60 is to be formed and the protrusion shape W2b at a position where the curved section 62 is to be formed are formed to have the same height, and in the compression step, by using the pressing element (pressing plate 84) having a stepped pressing surface 84a, 84b, the second workpiece W2 is pressed in a manner that the height of the curved section 62 is lower than the height of the straight section 60. As described above, also in the case where the height difference is generated in the compression step, in the method producing the separator 10, it is possible to suitably form the bead 50 where the height Hs of the straight section 60 and the height Hc of the curved section 62 are different.

What is claimed is:

1. A separator configured to be stacked on each of both surfaces of a membrane electrode assembly to thereby form a fuel cell, the membrane electrode assembly including an electrolyte membrane and electrodes provided on both surfaces of the electrolyte membrane, the separator comprising:
    a base part extending in a form of a surface; and
    a bead continuous with the base part and protruding from the base part in a stacking direction to form a seal,
    wherein:
    the bead includes, in plan view, a straight section extending straight and a curved section continuous with the straight section and curved from the straight section; and
    a height from the base part to a top part of the curved section is lower than a height from the base part to a top part of the straight section.

2. The separator according to claim 1, wherein the height from the base part to the top part of the curved section is gradually increased from a central position of the curved section in an extending direction in which the curved section extends, toward the straight section on each of both sides of the curved section in the extending direction.

3. The separator according to claim 1, wherein the separator includes a fluid passage as a passage of fluid in the stacking direction;
    the bead includes a passage bead provided outside the fluid passage to surround the fluid passage; and
    the passage bead includes the straight section and the curved section.

4. The separator according to claim 3, wherein the fluid passage has a polygonal shape in plan view; and the passage bead includes the straight section at a position adjacent to a side part of the fluid passage, and includes the curved section at a positon adjacent to a corner part of the fluid passage.

5. The separator according to claim 3, wherein the bead includes an outer bead outside the passage bead, in an outer peripheral portion of the separator; and
   a structure configured to reduce the height of the curved section to be lower than the height of the straight section is provided at a position adjacent to the outer bead in the passage bead.

6. The separator according to claim 1, wherein the curved section comprises a plurality of curved sections, and the bead includes the plurality of curved sections; and
   the height from the base part to the top part in a first curved section among the plurality of curved sections and the height from the base part to the top part in a second curved section among the plurality of curved sections are different from each other.

7. A separator configured to be stacked on each of both surfaces of a membrane electrode assembly to thereby form a fuel cell, the membrane electrode assembly including an electrolyte membrane and electrodes provided on both surfaces of the electrolyte membrane, the separator comprising:
   a base part extending in a form of a surface; and
   a bead continuous with the base part and protruding from the base part in a stacking direction to form a seal, wherein:
   the bead includes at least two curved sections in plan view; and
   of the curved sections, a height of one curved section having a larger curvature is lower than a height of another curved section having a smaller curvature.

8. A method of producing a separator, the separator being configured to be stacked on each of both surfaces of a membrane electrode assembly to thereby form a fuel cell, the membrane electrode assembly including an electrolyte membrane and electrodes provided on both surfaces of the electrolyte membrane,
   wherein the separator includes a base part extending in a form of a surface, and a bead continuous with the base part and protruding from the base part in a stacking direction to form a seal;
   the bead includes, in plan view, a straight section extending straight and a curved section continuous with the straight section and curved from the straight section; and
   when the separator is produced, the bead is formed in a manner that a height from the base part to a top part of the curved section is lower than a height from the base part to a top part of the straight section.

9. The method of producing the separator according to claim 8, comprising:
   pressing a first workpiece by a movable die and a fixed die to form a second workpiece having a protrusion shape at a position where the bead is to be formed; and
   pressing the second workpiece by a pressing element to thereby adjust a height of the bead.

10. The method of producing the separator according to claim 9, wherein, in the pressing of the first workpiece, a press height of the protrusion shape at a position where the curved section is to be formed, is formed to be lower than a press height of the protrusion shape at a position where the straight section is to be formed.

11. The method of producing the separator according to claim 9, wherein, in the pressing of the first workpiece, the protrusion shape at a position where the straight section is to be formed and the protrusion shape at a position where the curved section is to be formed are formed to have a same height; and
   in the pressing of the second workpiece, by using the pressing element having a stepped pressing surface, the second workpiece is pressed in a manner that a height of the curved section is lower than a height of the straight section.

* * * * *